Patented Feb. 14, 1939

2,146,730

UNITED STATES PATENT OFFICE 2,146,730

METALLIC AND HYDROXY DERIVATIVES OF DIBENZOFURANE

Henry Gilman and Richard V. Young, Ames, Iowa, assignors to Parke, Davis & Company, Detroit, Mich., a corporation of Michigan No Drawing. Application June 10, 1935,
Serial No. 25,942

4 Claims. (Cl. 260—346)

The invention relates to certain new diphenyl derivatives and to methods of making the same.

The new compounds may all be characterized as derivatives of diphenyl in which the two benzene nuclei of diphenyl have a second connection with each other by way of oxygen, to give a central 5-element heterocyclic nucleus. Hence, all of the compounds of this invention, whether substituted or unsubstituted, have the type formula

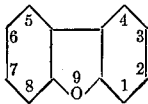

Dibenzofuran

It has now been found that compounds represented by the above general formula may be reacted with a reactive alkali metal to obtain organo-metallic derivatives and that said organo-metallic derivatives may be further reacted with other compounds to give other derivatives in which the metal has been substituted by other groups.

The invention is especially applicable to the preparation of metallo organic derivatives of the dibenzofuran type and more particularly those in which the reactive metal has replaced hydrogen attached to carbon atom 1 of the above general formula or attached to carbon atom 8 or has replaced both of these hydrogen atoms.

The dibenzofuran structure is present in the alkaloid morphine, as will be seen from the following structural formula:

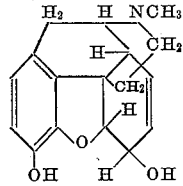

It is also evident that in morphine the two hydroxyl groups are in the positions 1 and 8 of the dibenzofuran grouping. Hence, any attempts to synthesize morphine or similarly constituted physiologically active chemical compounds from dibenzofuran ought preferably to include substitution in the 1- or 8-positions or both.

Heretofore, direct substitution reactions have been carried out in which a hydrogen atom attached to a carbon atom of one of the two benzene nuclei in dibenzofuran was substituted by another group, such as the sulfonic acid group, chlorine, bromine, or the nitro group. However, in none of these substitutions were the hydrogen atoms at the critical positions 1 or 8 replaced by the entering groups.

It has now been found that dibenzofuran and its derivatives containing an unsubstituted hydrogen atom at position 1 or position 8 or both can be reacted with alkali metals to obtain organo-metallic derivatives of dibenzofuran-type compounds in which positions 1 or 8 or both are substituted by the alkali metal. The term, reactive metal, in every instance where used herein is intended to include alkali metals such as lithium, sodium, potassium, and rubidium either in the free metallic state or equivalent form such as in alloys or amalgams or as in organo-metallic form, (e. g. as metal alkyl and metal aryl), in all of which forms the metal acts chemically in the same general manner as it does in its free metallic state, i. e. it retains its extreme reactivity toward other elements or groups of elements.

The invention is applicable to the preparation of alkali metal substituted compounds of dibenzofuran and will be more fully understood by the following examples which are given merely by way of illustration:

*Example 1.—1-dibenzofuryl-lithium*

One method of preparing 1-dibenzofuryl-lithium is to mix dibenzofuran and methyl-lithium in ether and seal in a Schlenk tube under nitrogen. This tube is allowed to stand at room temperature for a period of two weeks, during which time the reaction is completed and the 1-dibenzofuryl-lithium is formed. Upon opening of the tube it will be noted that considerable pressure is released which is probably due to the formation of methane during the reaction. The ether solution of 1-dibenzofuryl-lithium is readily oxidized and therefore it is not usually desirable to isolate the compound itself but to use the solution as such in any further reactions which it is desired to carry out. The compound 1-dibenzofuryl-lithium has chemical characteristics similar to related organo-metallic compounds such as phenyl sodium, methyl-lithium, etc. It is a salt-like solid, soluble in ether, readily hydrolyzed and highly reactive.

Another method of preparing 1-dibenzofuryl-lithium is to carry out the metallation with methyl-lithium in the conventional reaction flasks provided only with a trap to exclude moisture and air. The mixture is continually stirred for from fifteen to forty hours or longer, at which time the reaction is completed.

The ether solution obtained in either of the above processes when carbonated with solid carbon dioxide gives 1-dibenzofuran carboxylic acid.

This acid may be isolated in the usual manner by extracting the ether solution with alkali and precipitating the dibenzofuran carboxylic acid by addition of dilute mineral acid to the alkaline solution. Upon crystallization of the crude acid from ethanol the pure 1-dibenzofuran carboxylic acid is obtained melting at 208–209° C.

Example 2.—1-dibenzofurylsodium

A mixture of 16.8 g. (0.1 mole) of dibenzofuran, 2.3 g. (0.1 atom) of sodium cut in small pieces, 10 g. (0.0032 mole) of di-n-butylmercury and 60 cc. of petroleum ether (B. P., 68–70°) is sealed in a nitrogen-filled Schlenk tube which is shaken for two days and then allowed to stand for ten days. The solution is then found to contain 1-dibenzofurylsodium, which when carbonated with solid carbon dioxide gives 4.75 g. or a 36% yield of 1-dibenzofuran carboxylic acid. The sodium salt of the acid is only slightly soluble in water.

Another method is to shake the reactants for three days and then allow to stand at room temperature for two days, this yielding 40% of the acid after carbonation. In a third preparation, the reactants are shaken for four days and then allowed to stand for nineteen days to give a 58% yield of acid. The 1-dibenzofuran carboxylic acid material melts at 207–208° C., and one crystallization from alcohol gives the pure acid melting at 209° C. The preferred method of preparing 1-dibenzofurylsodium is to dissolve the dibenzofuran in ether, placed in a three-necked flask (in an inert atmosphere of nitrogen), provided with a stirrer, condenser and dropping funnel. The sodium metal is then added and finally the di-n-butylmercury through the dropping funnel. After the reaction has subsided the mixture is refluxed with stirring for several hours. The ether solution then contains a 1-dibenzofurylsodium.

Example 3.—1-dibenzofurylpotassium

In this example, sodium-potassium alloy, dibenzofuran and petroleum ether are sealed in a nitrogen filled tube which is shaken for three days and then allowed to stand for eight days at room temperature. Reaction develops at once, and a brown precipitate is formed. Carbonation with solid carbon dioxide gives 1-dibenzofuran carboxylic acid.

The 1-dibenzofuran carboxylic acid obtained in this example and in the other preceding examples has been compared with the same acid made by the method of Kruber, Ber. 65, 1382 (1932) and found to be identical.

Example 4.—Dimettalation of dibenzofuran 0.032 mole of dibenzofuran dissolved in 75 cc. of ether is placed in a 3-necked flask (in an inert atmosphere of nitrogen), provided with a stirrer, condenser, and dropping funnel. 0.08 atom of sodium metal is then added and finally 0.032 mole of di-n-butylmercury through the dropping funnel. After the reaction has subsided, the mixture is refluxed with stirring for several hours whereupon the 1,8-disodio dibenzofuran is formed. This product may be proved to be the 1,8-disodium derivative by converting it to its corresponding 1,8-dimethyl derivative by means of dimethyl sulfate, using the conventional method applicable to metallo organic compounds, and comparing its properties with that of a known specimen of 1,8-dimethyl dibenzofuran made by the method described by Sugii and Shindo, J. Pharm. Soc. Japan 54: 149 (1934). The 1,8-dimethyl dibenzofuran obtained by way of the new disodio derivative melts at 87° C. after crystallization from ethanol, and shows no depression in a mixed melting point determination with a sample made by the Sugii and Shindo method cited above.

Example 5.—Metallation of 1-methyldibenzofuran

The 1-methyldibenzofuran used as a starting material may be obtained by the method given in Example 8 below. Metallation by alkali metal is carried out in the same manner as given in the above examples and results in the formation of 8-methyl-1-dibenzofurylsodium or the other corresponding organo-metallic derivatives. Solutions of these derivatives may be carbonated to give 8-methyl-1-dibenzofuran carboxylic acid melting at 238–240° C. after crystallization from ethanol. The neutral equivalent of the acid, calculated as 226, is found to be 221. This 8-methyl-1-dibenzofuran carboxylic acid is then oxidized by permanganate to give 1,8-dibenzofuran dicarboxylic acid which is identified by conversion to its corresponding dimethyl ester. The dimethyl ester is clearly identified as such by a mixed melting point test with a known sample of the same.

Example 6.—Metallation of 1-methoxydibenzofuran

The 1-methoxydibenzofuran is prepared as given in Example 7 below. This compound is metallated with alkali metal in the same manner as previously given thereby obtaining 1-methoxy-8-sodio dibenzofuran or equivalent alkali metal compound which readily separates from the reaction mixture.

The sodio compound of this example can be used as a starting material for the preparation of corresponding hydroxy and dihydroxy compounds. For example, a mixture of the sodio compound and n-butyl-magnesium bromide is made up and oxygen passed in. At the end of the reaction the product is isolated in the usual manner to obtain solid 1-methoxy-8-hydroxydibenzofuran which, after numerous recrystallizations from petroleum ether (B. P., 65–75°), gives a melting point of 109–110°. The analysis calculated for $C_{13}H_{10}O_3$ is C, 72.9; H, 4.67, and that which has been found by experiment is C, 72.8; H, 4.7. This 1-methoxy-8-hydroxydibenzofuran is cleaved by refluxing with hydrogen iodide to form 1,8-dihydroxydibenzofuran.

In general, metallation can be carried out with a variety of organo-metal combinations, such as n-butyl sodium, n-butyl lithium, ethyl potassium, ethyl sodium which may be prepared in situ from tetraethyl lead and sodium chips or sodium powder, tetraethyl lead and sodium-potassium alloy, and n-butylmagnesium chloride and sodium-potassium alloy.

As further illustrations of the invention and to indicate the utility thereof, the following examples are given of preparation of compounds derived from those prepared in the above examples.

Example 7.—1-hydroxydibenzofuran

A quantity of 1-dibenzofurylsodium, made as in Example 2 is oxidized at 0° C. and with vigorous stirring by dry air to give 10.3 g. or a 35% yield of 1-hydroxydibenzofuran melting at 92–93°. Purification of the compound by crystallization from petroleum ether of boiling point 65–75° C. or from hot water gives the pure phenol melting at 102° C. An alcoholic solution of this compound gives a green color with ferric chloride.

Calculated analysis for $C_{12}H_8O_2$: C, 78.25; H, 4.35.

Found by experiment; C, 78.03; H, 4.52.

Zerewitinoff analysis shows one active hydrogen, and benzoylation by the Schotten-Baumann reaction gives the benzoate which melts at 91.92° C. after crystallization from alcohol.

A sample of 1-hydroxydibenzofuran is methylated by dimethyl sulfate to give 1-methoxydibenzofuran in 97% yield distilling at 164–165° C. (5 mm.) and melting at 52° C. after crystallization from petroleum ether.

Calculated analysis for $C_{13}H_{10}O_2$: C, 78.8; H, 5.05.

Found by experiment; C, 79.0; H, 5.13.

In connection with this example, it has been found that in general oxidation of the metallated compounds of the invention can be carried out with advantage in the presence of an equivalent of an n-alkyl magnesium bromide such as n-butyl magnesium bromide.

*Example 8.—1-methyldibenzofuran*

Methylation of 1-dibenzofuryl sodium is carried out by means of dimethyl sulfate and a 45% yield of 1-methyldibenzofuran is obtained. The identity of this compound is established by permanganate oxidation to the known 1-dibenzofuran carboxylic acid.

*Example 9.—1,8-dibenzofurandicarboxylic acid*

1,8-disodiodibenzofuran (from 5.4 g. (0.032 mole) of dibenzofuran) is carbonated in the usual manner by solid carbon dioxide. The product is then filtered by suction, and the residue added slowly to about 500 cc. of water. When evolution of hydrogen ceases, the mixture is heated to boiling and filtered. From the filtrate, subsequent to cooling and acidification, there is obtained 5.2 g. or a 77% yield of the dibasic acid, which melts at 325° after crystallization from ethanol. Neutral equivalent: calculated 128; found, 125.

The dibasic acid on esterification by methanol and hydrogen chloride gives dimethyl 1,8-dibenzofuran dicarboxylate in 95% yield and melting at 161–162°.

Calculated analysis for $C_{16}H_{12}O_5$: C, 67.5; H, 4.25.

Found: C, 67.26; H, 4.23.

*Example 10.—1,8-dimethyldibenzofuran*

1,8-disodiodibenzofuran (prepared by the use of a 10% excess of di-n-butylmercury to insure complete dimetallation) is treated with dimethyl sulfate in ether to give a 90% yield of crude dimethyl compound. The 1,8-dimethyldibenzofuran melts at 87° after crystallization from ethanol, and shows no depression in a mixed melting point determination with a known specimen of the same. (See Example 4 above.)

*Example 11.—1,8-diiododibenzofuran*

The diiodo compound is prepared by reacting 1,8-disodiodibenzofuran with iodine. It melts at 160° C. after recrystallization from n-propanol.

Calculated analysis for $C_{12}H_6OI_2$: I, 60.4.

Found: I, 60.7.

*Example 12.—1,8-dihydroxydibenzofuran*

Oxidation of 0.05 mole of the disodium compound suspended in ether is carried out in the presence of 0.1 mole of n-butylmagnesium bromide, in accordance with Ivanoff's procedure. (Ivanoff, Bull. Soc. chim. 39, 47 (1926).) When the color test for organo-metallic compound is negative, the mixture is allowed to warm up to room temperature over a period of several hours to prevent an explosion, which generally accompanies rapid warming. The 1,8-dihydroxydibenzofuran is separated from accompanying 1-hydroxydibenzofuran by its distinctly greater solubility in water. The dihydroxy compound melts at 190° C. An aqueous solution of 1,8-dihydroxydibenzofuran gives a light green color with 10% ferric chloride solution.

Calculated analysis for $C_{12}H_8O_3$: C, 72.0; H, 4.0.

Found: C, 72.25; H, 4.12.

*Example 13.—1,8-dibenzofurandisulfonic acid*

Sulfur dioxide is added to a suspension of the 1,8-disodio compound in ether cooled to 18°. After the rapid and complete reaction, the suspension is filtered and the residue dissolved in water. The solution is heated to boiling, filtered, and the filtrate cooled and acidified to yield 90% of 1,8-dibenzofurandisulfinic acid which decomposes at 183–185°.

The disulfinic acid is oxidized by potassium permanganate to 1,8-dibenzofurandisulfonic acid, which is obtained in a 50% yield and which decomposes at about 300°.

Calculated analysis for $C_{12}H_8O_7S_2$: S, 19.5.

Found: S, 19.16 and 19.21.

What we claim as our invention is:

1. The compound represented by the following formula:

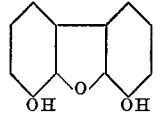

2. The process of preparing organo-metallic compounds which comprises reacting an alkali metal with a dibenzofuran compound having unsubstituted hydrogen in at least one of the positions 1 and 8 of the dibenzofuran nucleus and thereby replacing said hydrogen by said metal.

3. Compounds represented by the following general type of formula:

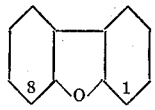

said compound having an alkali metal substituted in at least one of the positions 1 and 8.

4. Compounds represented by the following formula:

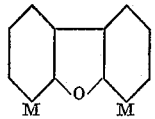

where M is an alkali metal.

HENRY GILMAN.
RICHARD V. YOUNG.